United States Patent [19]
Goodwin, III

[11] Patent Number: 5,751,919
[45] Date of Patent: May 12, 1998

[54] SYSTEM AND METHOD FOR PRINTING OVERLAYS FOR ELECTRONIC DISPLAY DEVICES

[75] Inventor: John C. Goodwin, III, Lawrenceville, Ga.

[73] Assignee: NCR Corporation, Dayton, Ohio

[21] Appl. No.: 744,564

[22] Filed: Nov. 6, 1996

Related U.S. Application Data

[63] Continuation of Ser. No. 223,259, Apr. 4, 1994, abandoned.

[51] Int. Cl.⁶ .................................................. G06F 15/00
[52] U.S. Cl. .................................................. 395/101; 395/117
[58] Field of Search .................................. 395/101, 117, 395/114, 115, 111, 110, 112

[56] References Cited

U.S. PATENT DOCUMENTS

| | | | |
|---|---|---|---|
| 4,101,366 | 7/1978 | Teraoka et al. | 156/378 |
| 4,875,174 | 10/1989 | Olodort et al. | 364/519 |
| 5,172,314 | 12/1992 | Poland et al. | 364/401 |
| 5,185,857 | 2/1993 | Rozmanith et al. | 395/148 |
| 5,241,467 | 8/1993 | Failing et al. | 364/401 |
| 5,245,533 | 9/1993 | Marshall | 364/401 |
| 5,263,744 | 11/1993 | Linder | 283/115 |
| 5,396,417 | 3/1995 | Burks et al. | 364/401 |
| 5,414,838 | 5/1995 | Kolton et al. | 395/600 |
| 5,455,945 | 10/1995 | VanderDrift | 395/600 |

*Primary Examiner*—Raymond J. Bayerl
*Assistant Examiner*—Steven P. Sax
*Attorney, Agent, or Firm*—Paul W. Martin

[57] ABSTRACT

A system and method for printing overlays for electronic display devices which prints overlays when an item is associated with an electronic shelf display. A database contains identification information for the products associated with the electronic shelf displays and identification information for the electronic shelf displays. A computer terminal retrieves the product information associated with the electronic shelf displays from the database and sends the product information to the printer in a queue. A printer prints the overlays. In a first embodiment, the printing occurs in a store. In a second embodiment, the printing occurs outside the store, preferably by the vendor of the electronic shelf displays. For this purpose, a computer terminal at the store downloads product information to another computer terminal located with the vendor. The vendor takes care of printing the overlays and attaching the overlays to the electronic shelf displays in order to reduce the store labor required to install the system.

13 Claims, 3 Drawing Sheets

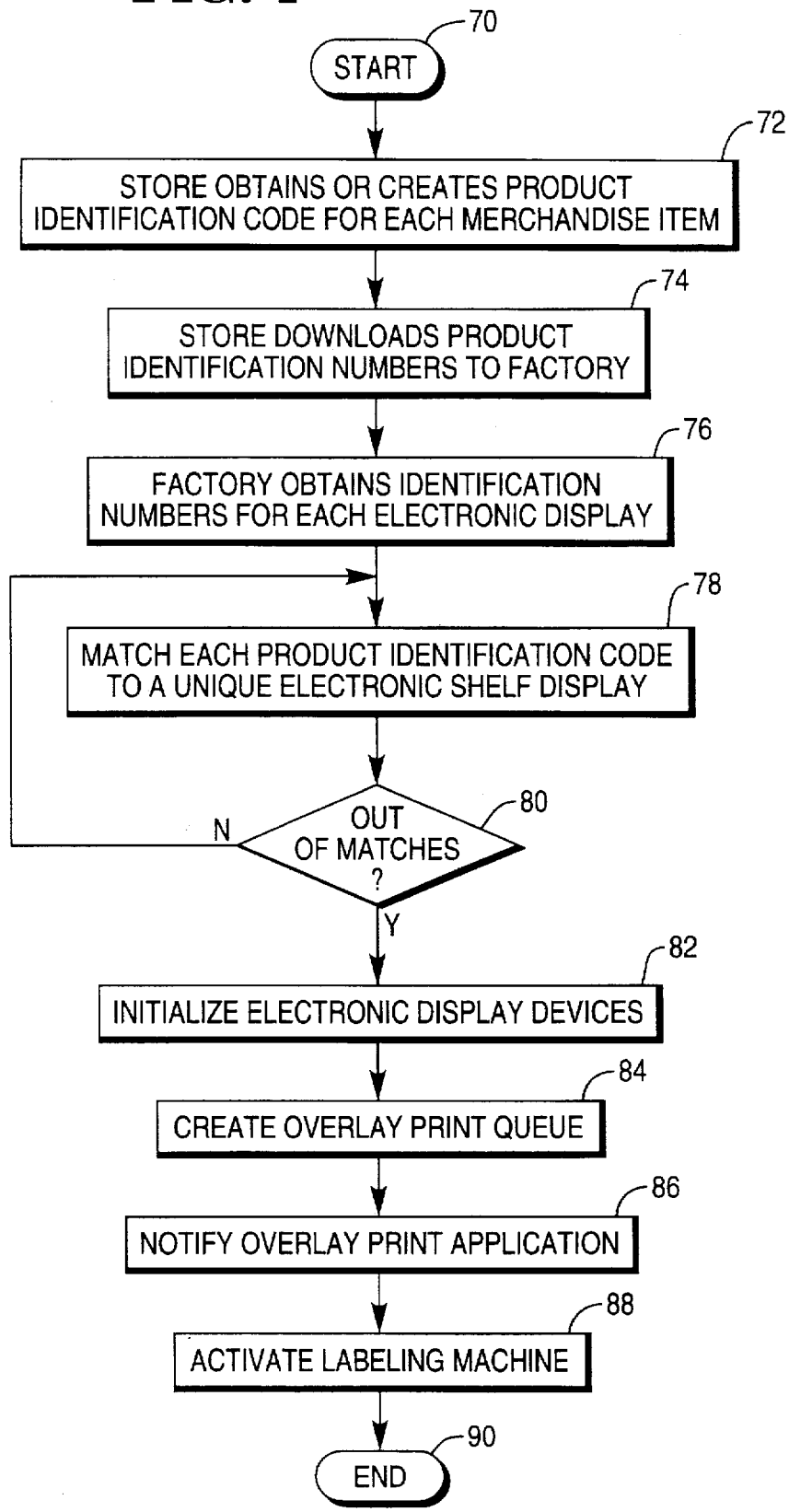

SYSTEM AND METHOD FOR PRINTING OVERLAYS FOR ELECTRONIC DISPLAY DEVICES

CROSS REFERENCE TO RELATED APPLICATION

This is a continuation of application Ser. No. 08/223,259 filed on Apr. 4, 1994, now abandoned.

The present invention is related to commonly assigned and co-pending U.S. application entitled, "System And Method For Connecting Product Code Information With Electronic Shelf Displays", invented by Goodwin, and having a docket number of 6043, Ser. No. 08/223,267 Apr. 4, 1994 which issued on Dec. 5, 1995 as U.S. Pat. No. 5,473,146.

BACKGROUND OF THE INVENTION

The present invention relates to electronic displays such as electronic shelf labels, and more specifically to a system and method for printing overlays for electronic display devices.

Electronic shelf label systems typically include a plurality of electronic displays for each item in a store. The electronic displays are coupled to a central server from where prices for all of the displays can be changed.

In order to reduce the cost of such systems, only a limited amount of information, including price information, is displayed electronically. Item descriptions and product codes are not likely to change. Therefore, such information is typically displayed through signs or overlays attached to the electronic shelf label.

Known methods for labeling electronic shelf displays are labor-intensive and occur one product at a time. A store employee obtains the overlay information, or new overlay information for an existing overlay, for the one product. After the information is collected, it is printed to form an overlay. The store employee must then return to attach the overlay to its respective electronic shelf label.

Therefore, it would be desirable to provide an improved system and method for printing batches of overlays for electronic display devices in order to reduce the amount of required store labor. It would also be desirable to provide a system and method for printing overlays which print the overlays when items are associated with electronic shelf displays (initial installation of the electronic shelf displays).

SUMMARY OF THE INVENTION

In accordance with the teachings of the present invention, a system and method for printing overlays for electronic display devices is provided. A database contains identification information for the products associated with the electronic shelf displays and identification information for the electronic shelf displays. A computer terminal retrieves the product information associated with the electronic shelf displays from the database and sends the product information to the printer in a queue. A printer prints the overlays.

It is a feature of the present invention that new overlays are printed when an item is associated with an electronic shelf display.

In a first embodiment, the system is located in a store. The store performs the tasks of printing the overlays and attaching them to their respective electronic shelf displays.

In a second embodiment, the printing and attaching steps occur outside the store, preferably by the vendor of the electronic shelf displays. For this purpose, a computer terminal at the store downloads product information to another computer terminal located with the vendor. The vendor takes care of printing the overlays and attaching the overlays to the electronic shelf displays in order to reduce the store labor required to install the system.

It is accordingly an object of the present invention to provide a system and method for printing overlays for electronic display devices.

It is another object of the present invention to provide a system and method for printing overlays for electronic display devices which prints new overlays when an item is associated with an electronic shelf display.

It is another object of the present invention to provide a system and method for printing overlays for electronic display devices which produce a plurality of printed overlays at the same time.

It is another object of the present invention to provide a system and method for printing overlays for electronic display devices which produce a plurality of printed overlays at the same time and which require minimal store labor to print and install the overlays.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a flow diagram illustrating the operation of the second embodiment of FIG. 2.

DETAILED DESCRIPTION OF THE PREFERRED EMBODIMENT

Figure 1:
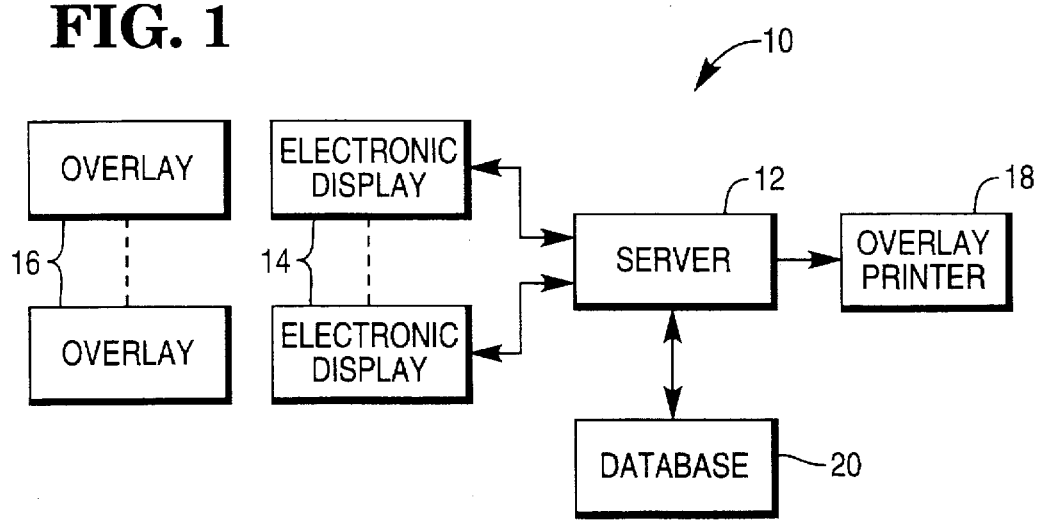
FIG. 1 is a block diagram of a first embodiment of the system the present invention.

Referring now to FIG. 1, electronic shelf label system 10 includes server 12, electronic shelf displays 14, overlays 16, overlay printer 18, and database 20.

Server 12 controls operation of system 10. Price and other information displayed at each of electronic shelf displays 14 may be changed by server 12. Server 12 also controls printing of overlays 16 which are mounted on electronic shelf displays 14.

Electronic shelf displays 14 preferably display price information for adjacent merchandise items, although additional information may also be displayed. Electronic shelf displays 14 may be coupled to server 12 through wire cables or through wireless transceivers mounted in both electronic shelf displays 14 and server 12.

Overlays 16 are mounted on electronic displays 14 and include printed information such as item descriptions, item bar code labels, item identification numbers, and promotional information. Overlays 16 may be made of paper or plastic, and may be attached using adhesives or special fasteners.

Overlay printer 18 prints overlays 16. Many overlays may be printed at the same time when standard letter-size adhesive paper is used.

Database 20 organizes product information and electronic shelf displays identification numbers.

Figure 2:
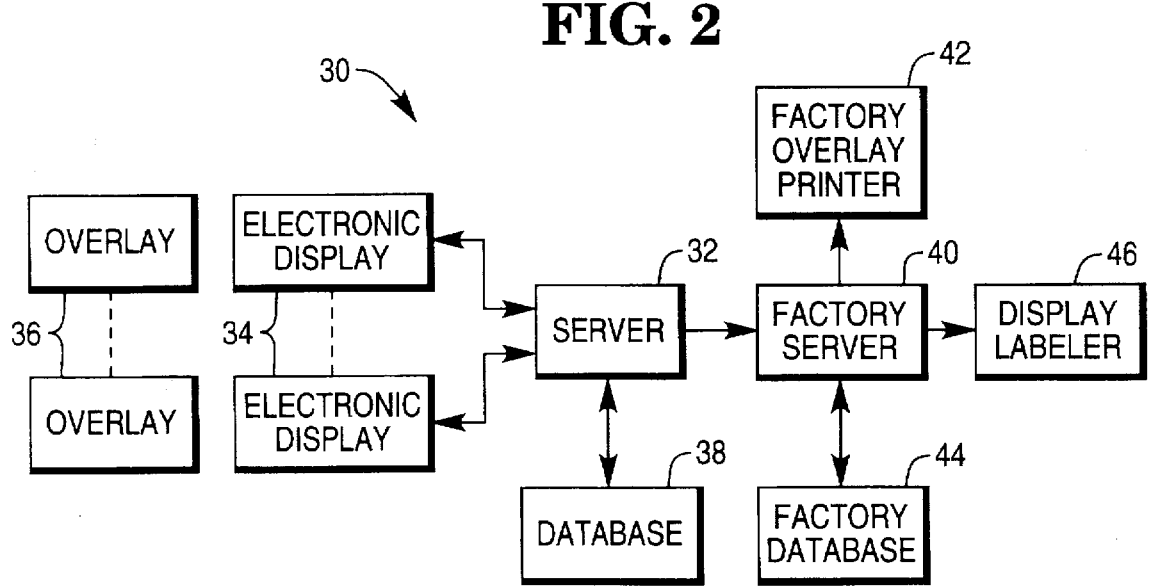
FIG. 2 is a block diagram of a second embodiment of the system of the present invention.

Turning now to FIG. 2, an alternative embodiment 30 of the system of the present invention is shown. Alternative embodiment 30 includes server 32, electronic shelf displays 34, overlays 36, database 38, factory server 40, factory overlay printer 42, and factory database 44.

Server 32 controls operation of the in-store portion of system 30. Prices displayed at each of electronic shelf displays 34 may be changed by server 32.

Electronic shelf displays 34 preferably display price information for adjacent merchandise items, although additional information may also be displayed. Electronic shelf displays 34 may be coupled to server 32 through wire cables or through wireless transceivers mounted in both electronic shelf displays 34 and server 32.

Overlays 36 are mounted on electronic displays 34 and include printed information such as item descriptions, item bar code labels, item identification numbers, and promotional information.

Database 38 organizes product information.

Factory server 40 matches product information downloaded from server 32 with electronic shelf display identification numbers, and controls printing of overlays 36. Here, the term factory refers to the electronic shelf display factory. Thus, the matching process and labeling process require less store labor than previous methods.

Factory overlay printer 42 prints overlays 36.

Factory database 44 organizes product information and electronic shelf display identification numbers.

Display labeler 46 attaches overlays 36 to electronic shelf displays 34. Overlays 36 are preferably printed on adhesive paper in serial fashion so that each overlay may be more easily severed from the rest and separated from its non-adhesive backing by display labeler 46. After the adhesive backing has been removed, display labeler 46 aligns the overlay 36 with the electronic shelf display 34.

Figure 3:
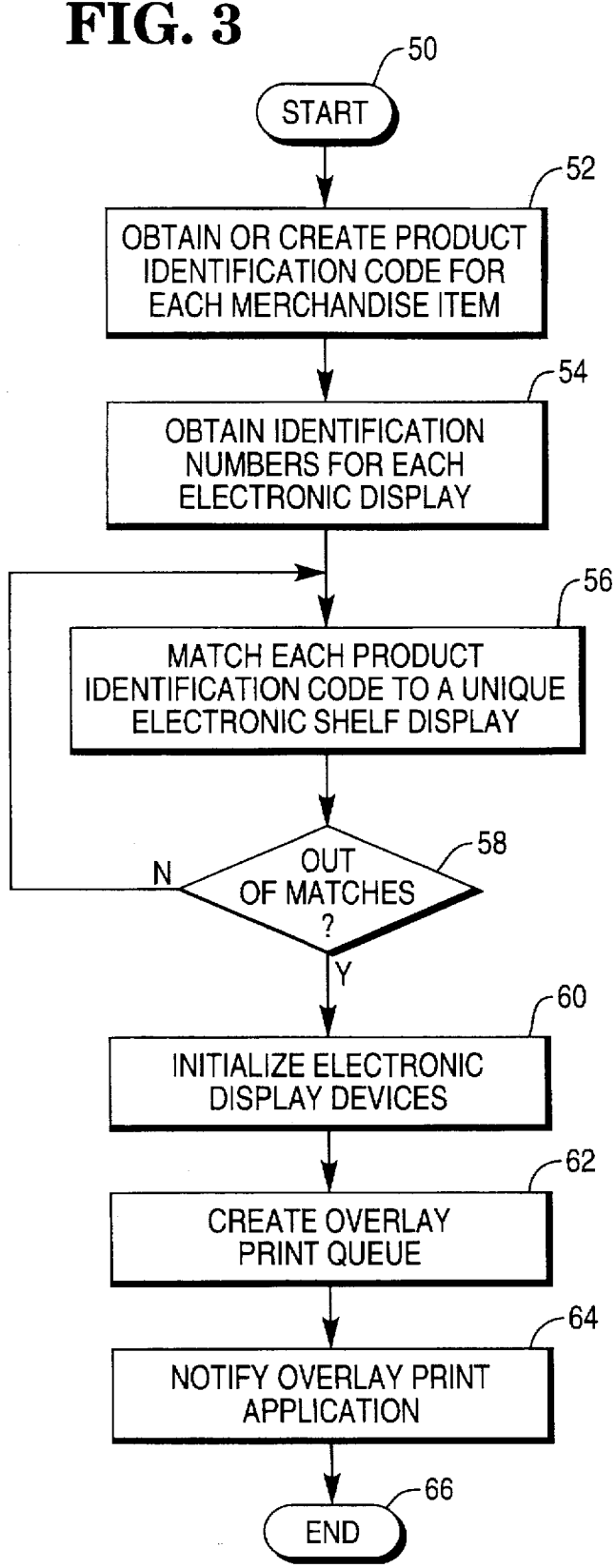
FIG. 3 is a flow diagram illustrating the operation of the first embodiment of FIG. 1.

Turning now to FIG. 3, the overlay printing method associated with FIG. 1 begins with START 50.

In step 52, server 12 obtains a product identification code for each merchandise item from inventory database 20.

In step 54, server 12 obtains identification numbers for each electronic display. These identification numbers and the corresponding locations of electronic shelf displays 14 may also be stored in a database.

In step 56, server 12 matches each product identification code to a unique electronic shelf display 14 and stores the association in its database.

In step 58, server 12 determines whether there are any remaining product identification numbers to be matched with electronic shelf displays 14. If so, then the method loops back to step 56 until there are no product identification numbers left.

If there are no remaining product identification numbers to be matched with electronic shelf displays 14, the method proceeds to step 60, in which server 12 initializes electronic shelf displays 14 with current information such as item price, unit price, location code, stock count, facings, and unique identifiers, as appropriate.

In step 62, server 12 organizes the product information for printing and executes an overlay printing application which creates an overlay print queue including each of overlays 16. The print queue may be created manually or automatically, depending upon the needs of the retail establishment.

In step 64, server 12 notifies the overlay print application to begin printing the overlays in the print queue by overlay printer 18. This step may be performed automatically or manually with operator intervention.

In step 66, the method ends.

Turning now to FIG. 4, the overlay printing method associated with FIG. 2 begins with START 70.

In step 72, server 32 obtains a product identification code for each merchandise item from inventory database 38. If a merchandise item is new, its product identification number may be entered into the database at this time.

In step 74, server 32 downloads the product identification information to factory server 40.

In step 76, factory server 40 obtains identification numbers for each electronic display 34.

In step 78, factory server 40 matches each product identification code to a unique electronic shelf display 34 and stores the association in its database 44.

In step 80, factory server 40 determines whether there are any remaining product identification numbers to be matched with electronic shelf displays 34. If so, then the method loops back to step 78 until there are no product identification numbers left.

If there are no remaining product identification numbers to be matched with electronic shelf displays 34, the method proceeds to step 82, in which factory server 40 initializes electronic shelf displays 34 with current information such as item price, unit price, location code, stock count, facings, and unique identifiers, as appropriate.

In step 84, factory server 40 organizes the product information for printing and executes an overlay printing application which creates an overlay print queue including each of overlays 36. The print queue may be created manually or automatically, depending upon the needs of the factory process.

In step 86, factory server 40 notifies the overlay print application to begin printing the overlays in the print queue by factory overlay printer 42. This step may be performed automatically or manually with operator intervention.

In step 88, factory server 40 activates display labeler 46 which attaches overlays 36 to electronic shelf displays 34.

Advantageously, the second embodiment requires less store labor as the matching and labeling steps are performed at the electronic shelf display factory.

In step 90, the method ends.

Although the present invention has been described with particular reference to certain preferred embodiments thereof, variations and modifications of the present invention can be effected within the spirit and scope of the following claims.

What is claimed is:

1. A system for printing a plurality of overlays containing information for items for attachment to new electronic shelf displays which display price information for the items and which are located at a place where the items are sold comprising:

a database containing the information for the items;

a printer for printing the overlays; and a computer terminal for adding identification information for the new electronic shelf displays to the database, for matching the information for the items to the electronic shelf display identification information, for initializing the new electronic shelf displays with the price information for the items, for creating a print queue containing overlay information, and for activating the printer to print the overlay information in the print queue.

2. A system for printing a plurality of overlays containing information for items for attachment to new electronic shelf displays at a first place outside a second place where the items are sold and where the new electronic shelf labels are to be installed comprising:

a first database at the first place containing electronic shelf display identification information;

a second database at the second place containing the information for the items;

a printer for printing the overlays;

a first server at the first place which is coupled to the first database, which adds the electronic shelf display identification information to the first database, which matches the information for the items from the second database to the electronic shelf display identification information in the first database, which creates a print queue containing overlay information, and which activates the printer to print the overlay information in the print queue; and a second server at the second place which downloads the information for the items to the first server for storage in the first database and which initializes the new electronic shelf displays with price information for the items after the new electronic shelf displays are installed at the second place.

3. The system as recited in claim 2, further comprising:

a label machine at the first place for attaching the printed overlays onto the new electronic shelf displays.

4. The system as recited in claim 3, wherein the first location comprises the factory of a seller of the new electronic shelf labels.

5. A system for printing a plurality of overlays containing item information for attachment to new electronic shelf displays in a place where items and their associated prices are displayed comprising:

a database at the place containing identification information for the items;

a printer at the place for printing the overlays containing the item information; and a computer terminal at the place for adding identification information for the new electronic shelf displays into the database, for matching the item identification information to the electronic shelf display identification information, for storing match information in the database, for initializing the new electronic shelf displays with price information for matched items, for creating a print queue containing overlay information, and for activating the printer to print the overlay information in the print queue.

6. A system for printing a plurality of overlays containing item information for attachment to new electronic shelf displays in a place where items and their associated prices are displayed comprising:

a first database at the place containing identification information for the items;

a second database at a location outside the place;

a printer located outside the place for printing the overlays containing the item information;

a first computer terminal at the place and coupled to the first database; and a second computer terminal outside the place and coupled to the first database and the printer for adding identification information for the new electronic shelf displays to the second database, for downloading the item information associated with the new electronic shelf displays from the first computer terminal for storage in the second database, for matching the identification information for the items with the electronic shelf display identification information, for storing match information in the first database, for initializing the new electronic shelf displays with price information for matched items, for creating a print queue containing overlay information, and for activating the printer to print the overlay information in the print queue.

7. A method for printing a plurality of overlays containing item information for attachment to a plurality of new electronic shelf displays in a place where merchandise items and their associated prices are displayed comprising the steps of:

(a) adding identification codes for each new electronic shelf display to a database by a computer terminal;

(b) obtaining the item information by the computer terminal;

(c) associating the item information with the identification codes for the new electronic shelf displays by the computer terminal;

(d) storing associations from step (c) in the database by the computer terminal;

(e) initializing the new electronic shelf displays with prices of items associated with the new electronic shelf displays by the computer terminal;

(f) organizing the item information into overlays by the computer terminal;

(g) executing an overlay printing application which creates an overlay print queue for printing the overlays for the new electronic shelf displays by the computer terminal; and (h) notifying the overlay printing application to begin printing the overlays containing the item information in the print queue by the computer terminal.

8. The method as recited in claim 7, wherein step (a) comprises the substeps of:

(a-1) obtaining the information for the merchandise items from a database by the computer terminal;

(a-2) obtaining the identification codes for the electronic shelf displays from the database by the computer terminal;

(a-3) matching the information for each merchandise item to one electronic shelf display by the computer terminal; and (a-4) storing matches produced by step (a-3) in the database by the computer terminal.

9. The method as recited in claim 7, further comprising the step of:

(e) initializing the electronic shelf displays with the information about the merchandise items.

10. A method for printing a plurality of overlays containing item information for attachment to a plurality of new electronic shelf displays in a place where items and their associated prices are displayed comprising the steps of:

(a) obtaining the item information by the first computer terminal in the place;

(b) adding identification codes for the new electronic shelf displays to a database by a second computer terminal outside the place;

(c) downloading the item information from the first computer terminal to the second computer terminal;

(d) associating the item information with the identification codes for the new electronic shelf displays by the second computer terminal;

(e) initializing the new electronic shelf displays with prices of items associated with the new electronic shelf displays by the second computer terminal;

(f) organizing the item information into overlays by the second computer terminal;

(g) executing an overlay printing application which creates an overlay print queue for printing the overlays for the new electronic shelf displays by the second computer terminal; and (h) notifying the overlay printing application to begin printing the overlays containing the item information in the print queue by the second computer terminal.

11. A system for printing a plurality of overlays containing information for items other than price information for attachment to new electronic shelf displays which display price information for the items and which are located at a place where the items are sold comprising:

a database containing the information for the items, including product identification codes for the items;

a printer for printing the overlays;

an overlay attaching machine for attaching the overlays to the new electronic shelf displays; and a computer terminal for adding electronic shelf display identification codes to the database, for matching the product identification codes to the electronic shelf display identification codes, for initializing the new electronic shelf displays with the price information for the items, for creating a print queue containing overlay information, for activating the printer to print the overlay information in the print queue, and for activating the overlay attaching machine following printing.

12. A system for printing a plurality of overlays containing information for items other than price information for the items for attachment to new electronic shelf displays in a place where the items and their associated prices are displayed comprising:

a database at the place containing identification information for the items;

a printer at the place for printing the overlays containing the information for the items other than the price information for the items;

an overlay attaching machine for attaching the overlays to the new electronic shelf displays; and a computer terminal at the place for adding electronic shelf display identification information to the database, for matching the item identification information to the electronic shelf display identification information, for initializing the new electronic shelf displays with the price information for the items, for creating a print queue containing overlay information, for activating the printer to print the overlay information in the print queue, and for activating the overlay attaching machine following printing.

13. A method for printing a plurality of overlays containing item information other than price information for attachment to a plurality of new electronic shelf displays in a place where merchandise items and their associated prices are displayed comprising the steps of:

(a) obtaining the item information by a computer terminal;

(b) adding identification codes for each electronic shelf display to a database by the computer terminal;

(c) associating the item information with the identification codes for the new electronic shelf displays by the computer terminal;

(d) storing associations in the database by the computer terminal;

(e) initializing the new electronic shelf displays with prices of items associated with the new electronic shelf displays by the computer terminal;

(f) organizing the item information other than the price information into overlays by the computer terminal;

(g) executing an overlay printing application which creates an overlay print queue for printing the overlays for the new electronic shelf displays by the computer terminal;

(h) notifying the overlay printing application to begin printing the overlays containing the item information other than the price information in the print queue by the computer terminal; and (i) activating an overlay attaching machine following printing.

* * * * *